United States Patent [19]

Chandler

[11] Patent Number: 4,523,741
[45] Date of Patent: Jun. 18, 1985

[54] LINEAR MOTION VALVE

[75] Inventor: Joseph A. Chandler, Dickinson, Tex.

[73] Assignee: The United States of America as represented by the Administrator of the National Aeronautics and Space Administration, Washington, D.C.

[21] Appl. No.: 636,465

[22] Filed: Jul. 31, 1984

[51] Int. Cl.³ .............................................. F16K 3/24
[52] U.S. Cl. ...................... 251/325; 251/349; 251/353; 277/80; 277/135
[58] Field of Search .............. 251/325, 324, 319, 353, 251/349, 332, 318; 277/80

[56] References Cited

U.S. PATENT DOCUMENTS

| | | | |
|---|---|---|---|
| 3,744,558 | 7/1973 | Childress | 165/71 |
| 4,252,353 | 2/1981 | Raj et al. | 277/80 |
| 4,284,605 | 8/1981 | Pierrat | 422/249 |
| 4,309,040 | 1/1982 | Pierrat | 277/80 |

Primary Examiner—Martin P. Schwadron
Assistant Examiner—John S. Starsiak, Jr.
Attorney, Agent, or Firm—Edward K. Fein; John R. Manning; Marvin F. Matthews

[57] ABSTRACT

A linear motion valve is provided. The valve spool employs magnetically permeable rings, spaced apart axially, which engage a sealing assembly having magnetically permeable pole pieces in magnetic relationship with a magnet. The gap between the ring and the pole pieces is sealed with a ferrofluid. Depletion of the ferrofluid is minimized.

5 Claims, 2 Drawing Figures

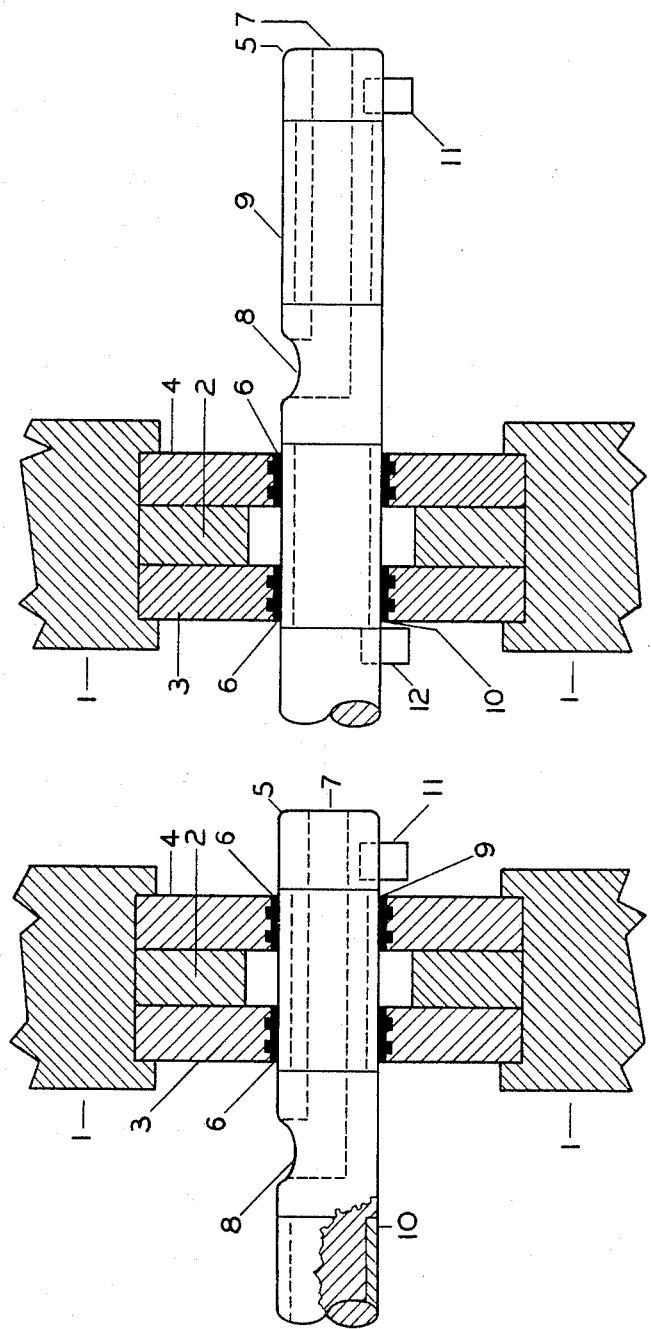

LINEAR MOTION VALVE

1. Origin of the Invention

The invention described herein was made by employee(s) of the United States Government and may be manufactured and used by or for the Government of the United States of America for governmental purposes without the payment of any royalties thereon or therefor.

2. Technical Field

This invention relates to a valve assembly. More specifically, this invention relates to a valve assembly operated by the linear motion or push-pull movement of the valve spool or shaft and employing a magnetic fluid as the sealant.

BACKGROUND ART

Magnetic fluids or ferrofluids, these two terms being used interchangeably in this application, are well known in the art. Ferrofluids are described in "Magnetic Fluids," *International Science and Technology*, July 1966, p. 48-56; U.S. Pat. No. 3,215,572; in the publication of R. Kaiser and G. Miskolczy, "Magnetic Properties of Stable Dispersions of Subdomain Magnetite Particles," J. Applied Physics, Vol. 41, No. 3, Mar. 1, 1970, pp. 1064-1072; in "A Catalog of Magnetic Fluids", Ferrofluidics Corporation, Burlington, Mass., 1972 and elsewhere.

Magnetic fluids or ferrofluids are used as sealants to provide a positive hermetic barrier against gas and other contaminants independent of differential pressure or direction. They have enjoyed particular utility as seals in many rotary shaft systems and exhibit long life, high reliability, low or immeasurable discharge and cost effectiveness. In principle, ferrofluid seals operate through the use of a ferrofluid in a gap between rotary and stationary surfaces in the presence of a magnet to provide focused radial magnetic flux lines which retain the ferrofluid in the gap about a rotating shaft.

The use of ferrofluids in shaft systems involving linear motion of the shaft has not proven to be as satisfactory as in rotary shaft systems. The difficulty in a shaft system involving linear motion of the shaft is the inherent depletion of the ferrofluid as a result of the wiping action of the shaft during linear motion. One approach to the solution of this problem has been the development of certain linear drive shaft seals as exemplified by U.S. Pat. Nos. 4,284,605 and 4,309,040.

A linear-motion valve is a particular example of a shaft system employing linear motion. Such a valve, sometimes called a push-pull valve, generally consists of a cylindrical valve spool, slideably disposed through a circular seal assembly. The valve spool contains an axial bore-like hole extending from its outer end to a point near its inner end and one or more radial holes connecting the inner end of the bore-like hole to the periphery of the valve spool. In a typical application, the circular seal assembly would be disposed in the wall of a vessel. Suitable stops are usually provided on the valve spool to permit or facilitate positioning the valve spool in either its open or closed position. Under high differential pressure conditions the detent holding action of the magnet on the magnetically permeable rings would be exceeded thereby necessitating a simple spring ball detent action on radial grooves in the spool to prevent the spool from moving from the set position.

It is an object of this invention to provide an improved valve assembly employing a linear motion valve spool and a magnetic fluid as the sealant wherein the loss of sealant due to the wiping action of the valve spool during its linear motion is minimized. Other objects will become apparent from the description of the invention.

STATEMENT OF THE INVENTION

The novel linear motion valve of this invention comprises a cylindrical valve spool having an axial bore-like hole extending from one end to and connecting with at least one radial hole terminating at the surface of the spool. The valve spool is slidably disposed through a sealing assembly such that the spool can be positioned so that the exits of the bore-like hole and the radial hole are on the same side of the sealing assembly or separated by the sealing assembly. The body of the valve spool is constructed of nonmagnetic material, encircled with two magnetically permeable rings axially positioned one on each side of the exit of the radial hole. The sealing assembly comprises two magnetically permeable pole pieces each in a magnetic relationship with opposite poles of a permanent magnet. The two pole pieces are constructed such that when either of the magnetically permeable rings on the valve spool is positioned in the seal assembly, a close, noncontacting magnetic relationship exists providing a gap between the two pole pieces and the particular magnetic ring. The gap is filled with a ferrofluid to provide an effective seal.

BRIEF DESCRIPTION OF THE DRAWINGS

FIG. 1 is a schematic drawing of the linear motion valve of this invention in the open position.

FIG. 2 is a schematic drawing of the linear motion valve of this invention in the closed position.

DESCRIPTION OF A PREFERRED EMBODIMENT OF THE INVENTION

Referring to FIGS. 1 and 2, the novel linear motion valve of this invention is schematically shown as it would be disposed in the nonmagnetic wall 1 of a vessel, such as a vacuum chamber. Permanent magnetic ring 2 is positioned between magnetically permeable pole pieces 3 and 4. The pole pieces 3 and 4 are disposed in close noncontacting relationship to valve spool 5 to provide a gap 6 with the surface of valve spool 5. The surfaces of pole pieces 3 and 4 adjacent to valve spool 5 are preferably grooved as shown to facilitate an adequate retention of a ferrofluid with which the gap is filled as shown.

Cylindrical valve spool 5, formed of nonmagnetic material, such as aluminum or a suitable polymeric material, has an axial bore-like hole 7 connecting with radial hole 8 passing through the surface of valve spool 5. Magnetically permeable rings 9 and 10 encircle valve spool 5 and are positioned such that the exit of radial hole 8 through the surface of valve spool 5 is between magnetically permeable rings 9 and 10. Magnetically permeable rings 9 and 10 have a length approximating the distance between the outside surfaces of permeable pole pieces 3 and 4 and an outside diameter approximating that of valve spool 5. The distance between the magnetically permeable rings 9 and 10 is controlled to the minimum dimension required for parting of radial hole 8 to prevent total loss of sealing from one ring before second ring establishes a seal. Stops 11 and 12 are provided to accurately position valve spool 5 in its open or closed position.

The operation of the linear motion valve assembly of this invention is conventional and exceedingly simple. As an example, the valve assembly can be disposed in the wall of a closed vessel within which it is desired to pull a vacuum. A vacuum pump can be attached to the outlet end of valve spool 5 and the valve spool linearly moved to its open position shown in FIG. 1. Once the desired vacuum has been attained, the valve spool is then linearly moved to its closed position shown in FIG. 2.

It is readily seen that limiting the extent of the magnetically permeable length of the valve spool through the use of limited length magnetically permeable rings, will significantly reduce any wiping action resulting from the linear motion of the valve spool and the resultant loss of ferrofluids in the seal gap. As the nonmagnetic portion of the valve spool passes between the pole pieces, magnetic flux lines are altered such that the ferrofluid is retained in the gap.

The magnetic fluid or ferrofluid, employed in the practice of this invention, is a ferromagnetic fluid displaying superparamagnetism, having a magnetic polarizability that is substantially uniform and having the property such that when a gradientmagnetic field is applied to it, a body of forces develop within it which can exceed by orders of magnitude the ordinary force of gravity on a unit volume of the material. Ferrofluid comprises a colloidal dispersion of finely divided magnetic particles of subdomain size whose liquid condition is remarkably unaffected by the presence of an applied magnetic field, and which particles resist settling under the influence of gravitational, centrifugal, magnetic or other force fields. Ferrofluid particles typically ranging in size up to about 300 A remain uniformly dispersed throughout the liquid carrier due to thermal agitation.

Typically, a ferrofluid is prepared by ball-mill grinding of a magnetic powder, such as magnetite, to reduce its particle size to the colloidal range. The grinding is carried out in the presence of a liquid carrier and a grinding aid which serves also as a dispersing agent. The dispersing agent is typically a surfactant comprising a polar long-chain molecule whose polar group absorbs onto the surface of the particle to produce a monomolecular protective coating that prevents particles from attaching to each other. Ferrofluids have a low vapor pressure, about $1 \times 10^{-8}$ torr, and, consequently, can be used as a sealant in many applications, including those applications involving low and moderate vacuum. An excellent ferrofluid known not only for its magnetic properties but also for its stability and lubricating properties is D04 Ferrofluid, manufactured by Ferrofluidics Corporation of Burlington, Mass. and rated at 450 gauss and 750 centipoise.

While a preferred embodiment of this invention has been described in connection with the use of the linear motion valve in a typical vacuum-type application, the utility of the linear motion valve assembly of this invention is not limited thereto. The linear motion valve assembly of this invention has utility in typical gas analysis equipment conventionally employed for medical purposes or industrial process control in the chemical industry. Furthermore, more than one ferrofluidic seal can be used on a single valve spool. In such an instance, the valve assembly could be used as a multiple position switching valve such as would be commonly employed in a plumbing system.

What is claimed is:

1. A linear motion valve comprising, in combination, a cylindrical valve spool slideably disposed in a valve sealing assembly, said valve spool being constructed of nonmagnetic material encircled with at least two separate and axially spaced apart rings of magnetically permeable material, said valve spool being capable of being positioned such that any of said rings is in sealing relationship with the valve sealing assembly, said valve sealing assembly comprising two magnetically permeable pole pieces, one end of each being in a magnetic relationship with opposite poles of a magnet and the other end of each being in a close noncontacting relationship to a magnetically permeable ring on the valve spool so as to provide a gap between said pole pieces and said magnetically permeable ring, and said gap containing a ferrofluid to provide an effective seal.

2. The linear motion valve of claim 1, wherein the axial length of the magnetically permeable rings is approximately equal to the distance between the outside surfaces of the magnetically permeable pole pieces.

3. The linear motion valve of claim 2, wherein the outside diameter of the magnetically permeable rings is approximately equal to the outside diameter of the valve spool.

4. A linear motion valve of claim 3, wherein the valve spool has an axial bore-like hole extending from one end of the spool to and connecting with one or more radial holes terminating at the surface of the valve spool between the magnetically permeable rings.

5. The linear motion valve of claim 4, wherein the valve spool is encircled by two or more magnetically permeable rings spaced apart axially on opposite sides of the radial holes.

* * * * *